(12) United States Patent
Ledbetter

(10) Patent No.: US 6,848,465 B1
(45) Date of Patent: Feb. 1, 2005

(54) DUAL-ACTION VENT CHECK VALVE

(75) Inventor: Jonathan T. Ledbetter, Kernersville, NC (US)

(73) Assignee: Robert H. Wager Co., Inc., Rural Hall, NC (US)

( * ) Notice: Subject to any disclaimer, the term of this patent is extended or adjusted under 35 U.S.C. 154(b) by 371 days.

(21) Appl. No.: 10/124,206

(22) Filed: Apr. 17, 2002

(51) Int. Cl.$^7$ .......................... B65D 51/16; F16K 24/04; F16K 31/22; F16K 33/00
(52) U.S. Cl. ................ 137/315.04; 55/385.1; 55/512; 55/515; 96/147; 137/202; 137/388; 137/423; 137/433; 137/550; 210/163; 210/232; 210/432
(58) Field of Search ................ 137/192, 202, 137/388, 423, 430, 433, 315.04, 550, 15.26; 55/385 R, 387, 385.1, 385.4, 490, 512, 515; 405/36, 37; 96/147; 210/163, 232, 293, 429

(56) References Cited

U.S. PATENT DOCUMENTS

| | | | | |
|---|---|---|---|---|
| 859,540 A | * | 7/1907 | Bonnell | 137/433 |
| 950,533 A | * | 3/1910 | Hilliard | 137/202 |
| 1,176,785 A | * | 3/1916 | Stielow | 137/430 |
| 2,510,098 A | * | 6/1950 | Geisler | 137/43 |
| 3,620,240 A | | 11/1971 | Bogdanski | 137/202 |
| 3,903,918 A | * | 9/1975 | Carnarius | 137/433 |
| 4,030,851 A | | 6/1977 | Graybeal | 404/25 |
| 4,512,492 A | | 4/1985 | Graybeal | 220/204 |
| 4,524,794 A | * | 6/1985 | Haines | 137/202 |
| 4,586,941 A | | 5/1986 | Cooley | 55/385 R |
| 4,630,531 A | | 12/1986 | Krauss | 98/52 |
| 4,640,304 A | | 2/1987 | Looney | 137/202 |
| 5,613,513 A | | 3/1997 | Makowan | 137/1 |
| 5,823,259 A | * | 10/1998 | Royle | 137/202 |
| 5,915,408 A | * | 6/1999 | Dudley | 137/433 |
| 6,016,828 A | | 1/2000 | Machledt | 137/202 |
| 6,129,110 A | * | 10/2000 | Kolb | 137/433 |
| 6,131,605 A | * | 10/2000 | Kothe et al. | 137/433 |

OTHER PUBLICATIONS

Wager Company, 1500 Series Marine Vertical Vent Check Valve, www.wagerusa.com/pages/marine/1500vertical.html, 1995 (last visited Jul. 17, 2002).

* cited by examiner

Primary Examiner—George L. Walton
(74) Attorney, Agent, or Firm—Womble Carlyle Sandridge & Rice, PLLC

(57) ABSTRACT

A dual-action vent check valve is disclosed. The valve includes a first check valve which is responsive to elevated fluids inside the valve. A second check valve is responsive to elevated fluids external to the valve. The first check valve prevents overflow from a vented structure, such as a sewer out-fall line, from passing through and out of the valve, thereby preventing spills. The second check valve operates to prevent floodwater from passing into an underground structure, such as a sewer, through the vent. One embodiment of the invention includes a basket for enclosing a deodorizing material inside the valve for deodorizing gases which pass through the valve.

23 Claims, 9 Drawing Sheets

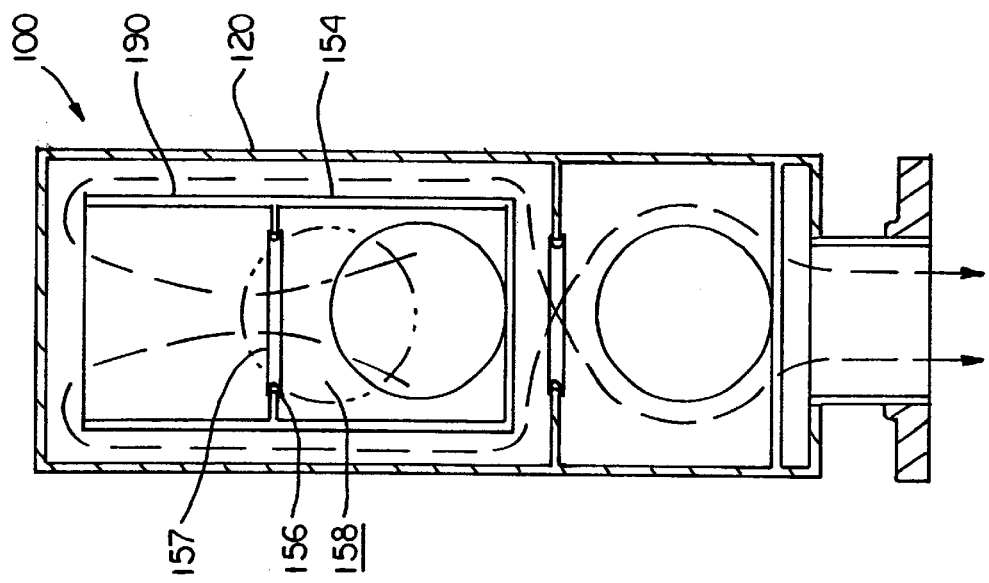
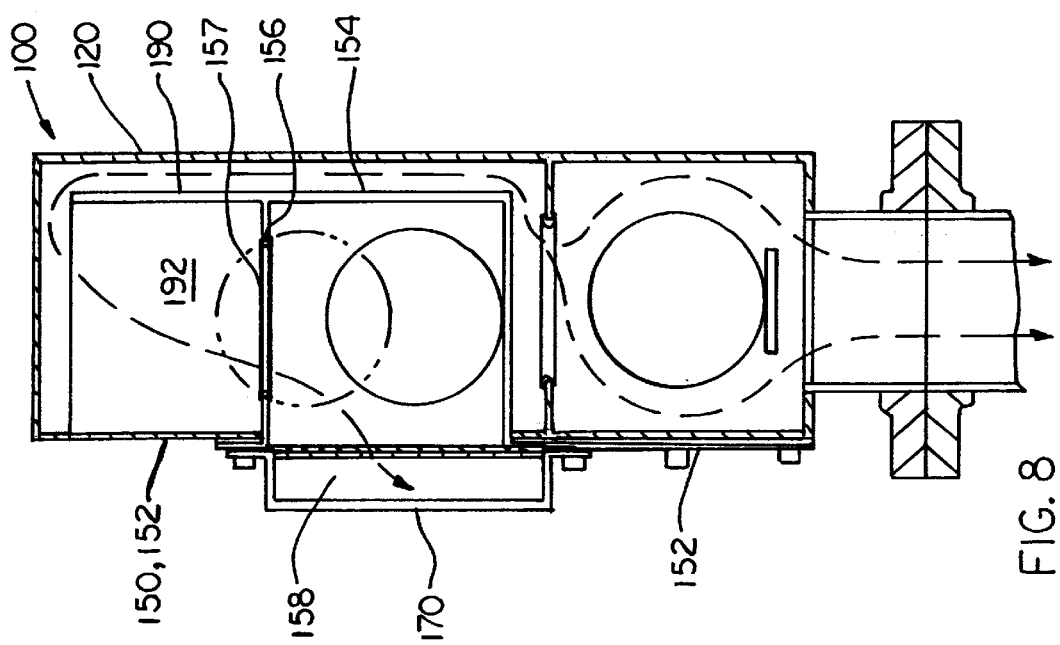

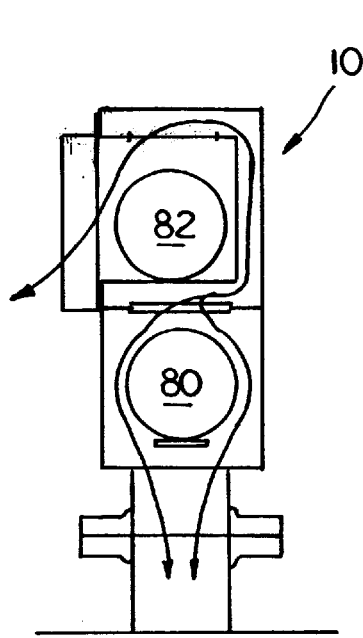
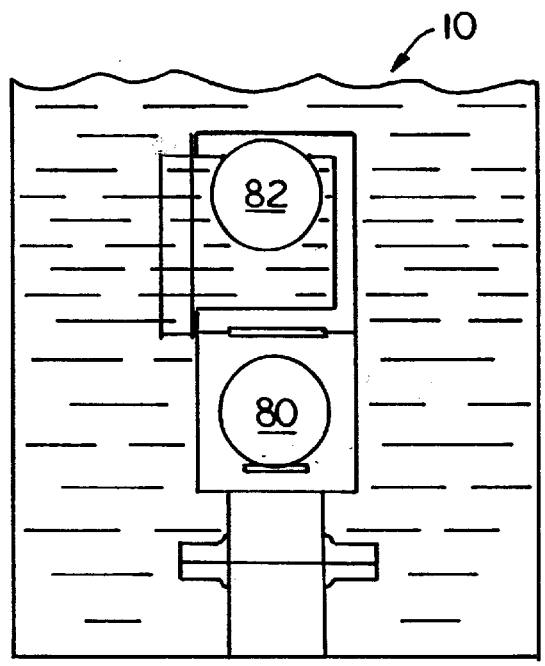
FIG. 11A
FIG. 11B
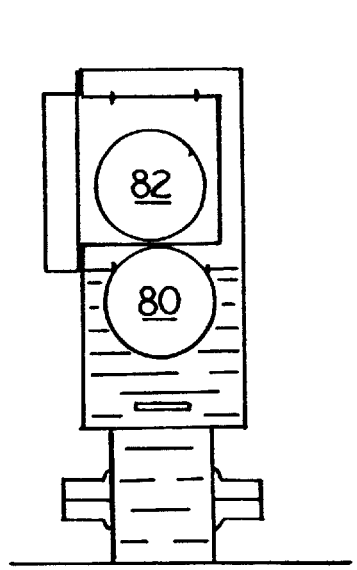
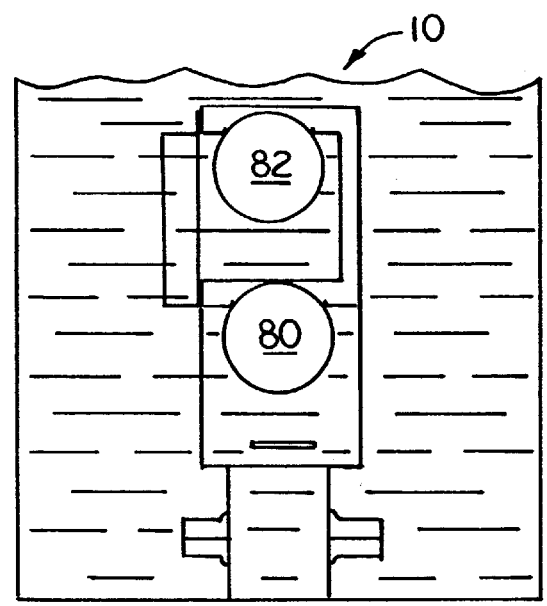
FIG. 11C
FIG. 11D

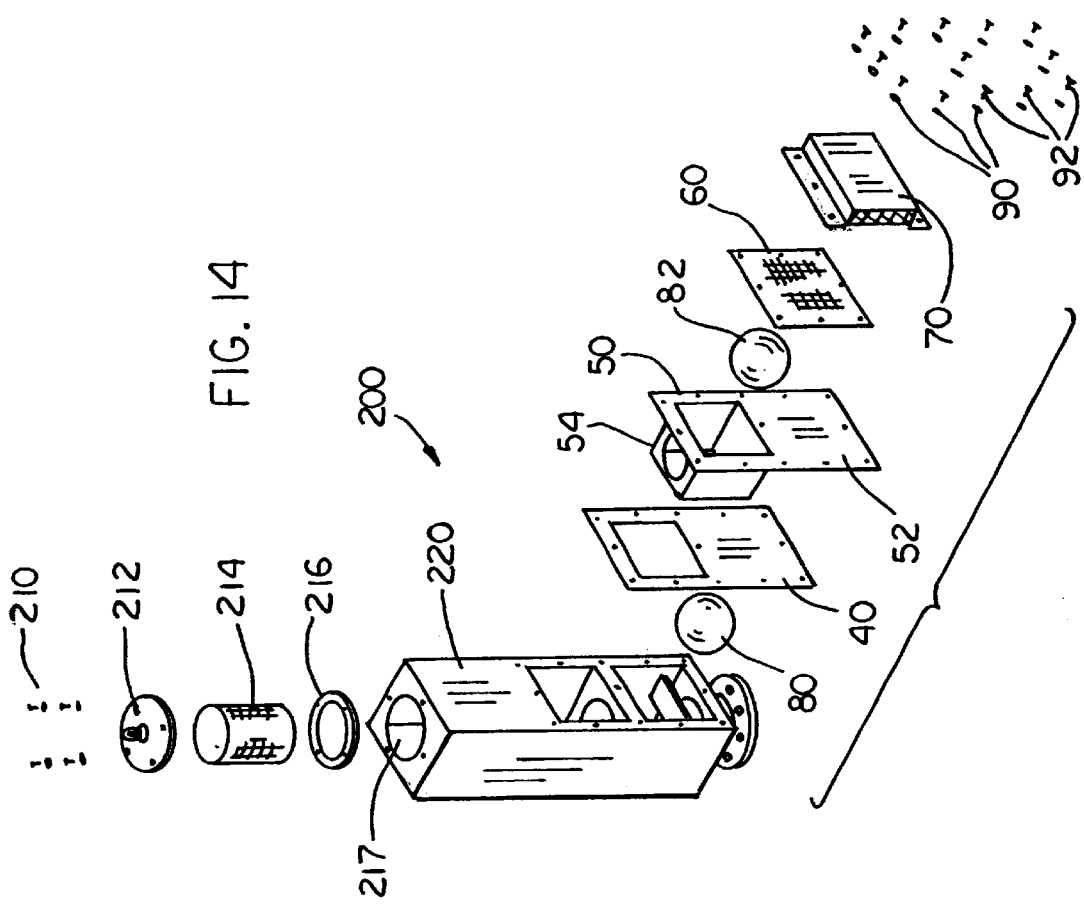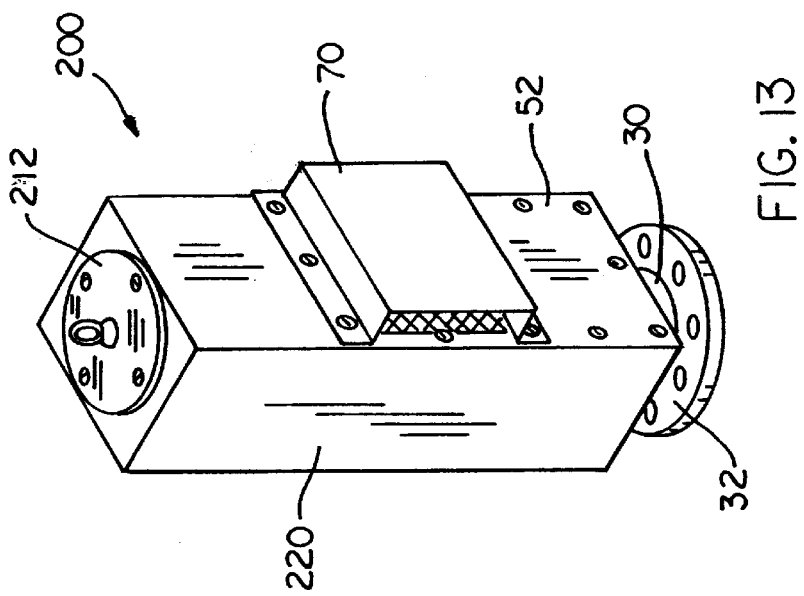

DUAL-ACTION VENT CHECK VALVE

BACKGROUND

1. Field of the Invention

The invention relates to valves, and more specifically, to a dual-action vent check valve which prevents elevated fluids from passing through the valve in either of two opposed directions. The invention is particularly adapted for use with vents for sewer out-fall lines.

2. Description of the Prior Art

Underground enclosures, such as sewer manhole structures, vaults for underground utilities, underground storage tanks, underground piping systems, and the like, often include vents for permitting air and other gases to flow between the enclosures and the surrounding atmosphere. Such vents permit gas pressure to equalize between the enclosures and the atmosphere, and permit off-gases to vent from the enclosures to the atmosphere. These vents may include a vertical vent pipe having a substantially open end. In flood prone areas, the upper ends of such vent pipes may be elevated above a predetermined flood level to prevent the inflow of floodwater into the enclosures through the open vents during flood conditions. The top ends of such vent pipes may include a down-turned "gooseneck" portion to inhibit the entry of rainwater or other materials into the otherwise open end of the vent pipe.

As an alternative to elevated vent pipes, an entire manhole structure may be elevated above a predetermined flood level to prevent inflows of floodwater. Concrete risers may be stacked to a desired elevation to elevate the manhole above flood level. Though such elevated vent pipes and manholes are at least somewhat effective to prevent floodwater entry, they add considerable cost to the construction of underground installations. Furthermore, such elevated structures are visually prominent and may be unsightly, particularly in residential areas.

In order to eliminate the need for such elevated structures in flood-prone areas, inverted vent check valves are sometimes mounted on the down-turned ends of vent pipes to prevent inflows of floodwater through the vents. Such valves include a single internal float which closes the valve in response to rising floodwater. Though such single-action vent check valves are effective to prevent floodwater from entering underground installations, such valves cannot prevent rising liquids inside the underground structures from flowing from the structures through the vents. In the case of sewer out-fall lines, rising liquids in an over-capacity sewer may rise in the vent pipe and pass out of the sewer system through the vent pipe. Such sewer outflows are undesirable because they may contaminate the surrounding area and waterways, thereby creating a potential health hazard and possibly harming the environment. Therefore, there is a need for a dual-action vent check valve which not only prevents inflows of floodwater, but which also prevents outflows of liquids from vented underground structures. In particular, there is a need for a dual-action vent check valve suited for installation on vents for sewer out-fall lines in flood prone areas.

In the case of sewer vents, sewer off-gases may be vented from the sewer to the surrounding atmosphere through the vents. Because such gases may have an objectionable or offensive odor, such vented gases are undesirable, particularly in residential areas. Therefore, there is also a need for a means to neutralize objectionable odors from sewer vents. Further, there is a need for a dual-action vent check valve which neutralizes objectionable odors vented from sewers through the valve.

SUMMARY OF THE INVENTION

The present invention meets these needs by providing a dual-action vent check valve having an outer housing including a first port and a second port. The first and second ports are arranged to permit gases to pass through and between the first and second ports in two opposed directions during dry conditions. A first check valve is positioned in the outer housing, and is designed to substantially prevent a first elevated liquid inside the valve which has risen to or above a first trigger level from passing through the valve. A second check valve is also positioned in the housing, and is designed to substantially prevent a second elevated liquid external to the valve which has risen to or above a second trigger level from passing through the valve. The first and second check valves are substantially vertically aligned one above the other. The valve may also include a basket for holding an odor adsorbing material, the basket being designed such that gases passing through the valve also pass through the odor adsorbing material in the basket.

In another aspect, the invention provides a vent check valve having an outer housing. The outer housing includes a bottom and a front. The bottom includes a lower port and the front includes an upper port. A partition divides the outer housing into an upper chamber and a lower chamber, and includes a first valve opening having a first valve seat. An inner housing is disposed in the upper chamber, and includes a top having a second valve opening and a second valve seat. The inner housing also includes a window which is in communication with the upper port. The lower port, the first valve opening, the second valve opening, the window, and the upper port together define a gas flow path through the valve. A lower float is disposed in the lower chamber. The lower float is designed to cooperate with the first valve seat to substantially prevent rising liquid in the lower chamber which has entered the valve through the lower port from passing from the lower chamber into the upper chamber. An upper float is disposed in the inner housing in the upper chamber, and is designed to cooperate with the second valve seat to substantially prevent rising liquid exterior to the outer housing which has entered the valve through the upper port from passing from the upper chamber into the lower chamber. The second valve opening is substantially vertically above the first valve opening.

In a third aspect, the invention includes a sewer manhole structure including a substantially vertical sewer vent pipe having an upper end. A vent check valve is attached to the upper end of the vent pipe. The vent check valve includes a valve housing including a first port and a second port designed to permit gas or vapor to pass into and through the valve in either direction under dry conditions. The valve also includes a first check valve in the housing. The first check valve is designed to substantially prevent elevated sewer overflow in the sewer vent pipe which has risen to or above a first trigger level from passing through the valve. The vent check valve further includes a second check valve in the housing. The second check valve is designed to substantially prevent elevated floodwater which has risen to or above a second trigger level from passing through the valve and into the vent pipe. The first and second check valves are substantially vertically aligned one above the other and above the vent pipe.

These and other aspects of the invention will be apparent from a reading of the following description together with the drawings.

BRIEF DESCRIPTION OF THE DRAWINGS

FIG. 8 is a side cross-sectional elevation view of the vent check valve shown in FIG. 7;

FIG. 9 is a front cross-sectional elevation view of the vent check valve shown in FIGS. 7 and 8;

FIG. 11A is a side cross-sectional view of a vent check valve according to the present invention showing the open positions of the floats under dry conditions;

FIG. 11B is view of the valve of FIG. 11A with the upper float in a closed position in response to external flood conditions;

FIG. 11C is a view of the valve of FIG. 11A with the lower float in a closed position in response to internal overflow conditions;

FIG. 11D is a view of the valve of FIG. 11A with the upper and lower floats in closed positions in response to simultaneous flood and internal overflow conditions;

FIG. 13 is a perspective view of a third embodiment of a vent check valve according to the present invention;

FIG. 14 is an exploded perspective view of the valve shown in FIG. 13;

DETAILED DESCRIPTION

Figure 1:
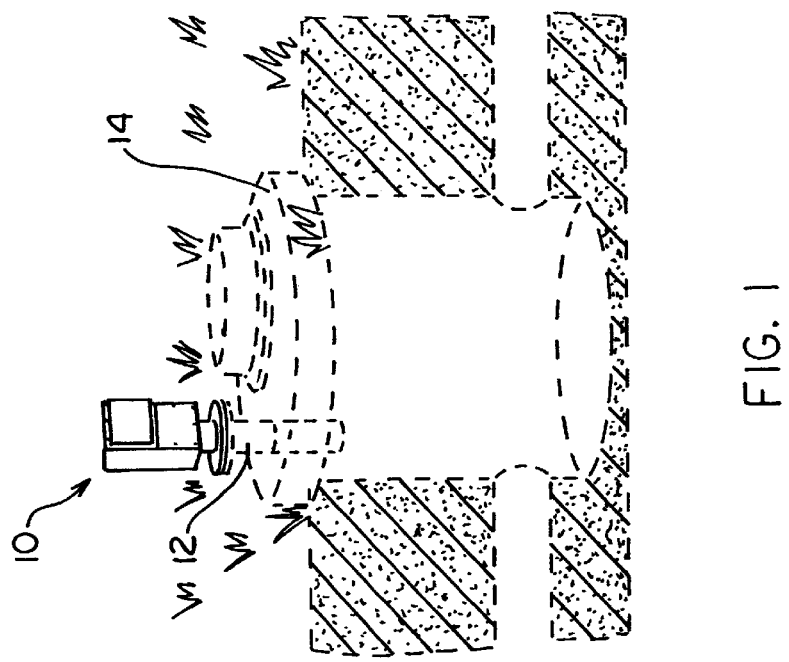
FIG. 1 is a perspective view of a vent check valve according to the present invention mounted on a sewer manhole structure.

Referring now to the drawings in general and FIG. 1 in particular, it will be understood that the illustrations are for the purpose of describing a preferred embodiment of the invention and are not intended to limit the invention thereto. FIG. 1 shows an environmental view of a dual-action vent check valve 10 according to the present invention. Valve 10 is mounted atop a short vertical vent pipe 12 on a manway structure 14. Because valve 10 is effective to block floodwater from entering the sewer through the vent pipe, the top end of the vent pipe may be positioned well below floodlevel, and the top of manway structure 44 may be positioned at or near ground level.

Figure 2:
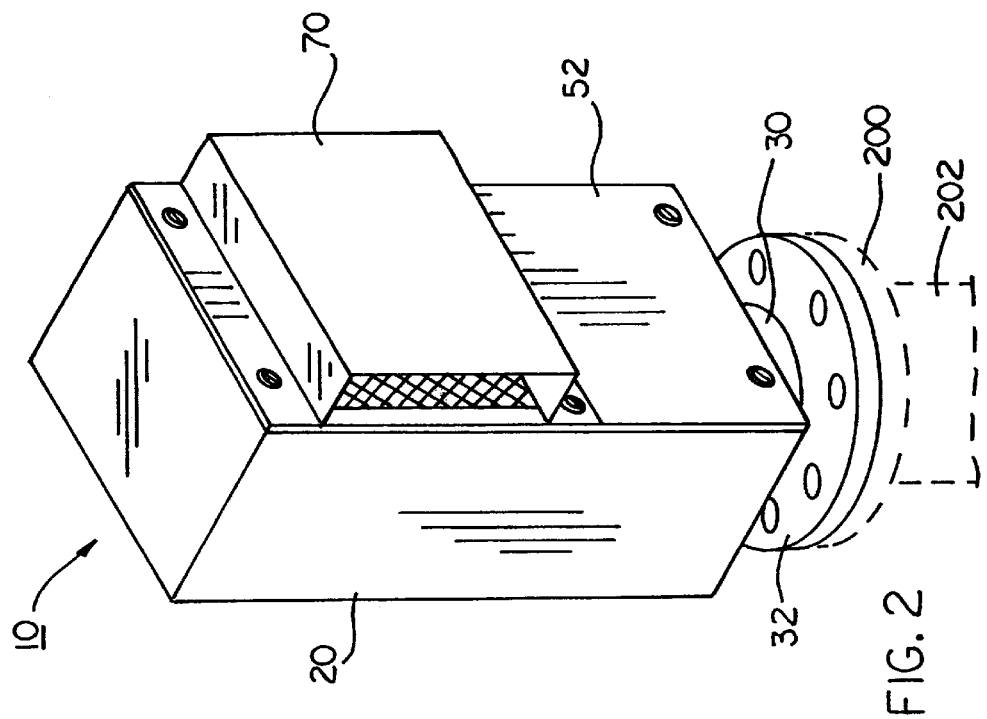
FIG. 2 is an enlarged perspective view of the vent check valve shown in FIG. 1.

A first embodiment 10 of the invention is illustrated in FIGS. 2–6. As shown in FIG. 2, the valve 10 has a substantially upright construction, and may include a rectilinear outer housing 20. The front of the valve 10 may include removable front panel 52 and a removable baffle cover 70.

The lower end of valve 10 includes a pipe portion 30 and a flange 32. Flange 32 is suited for connection to a mating flange 200 on a vertical vent pipe 202.

Figure 3:
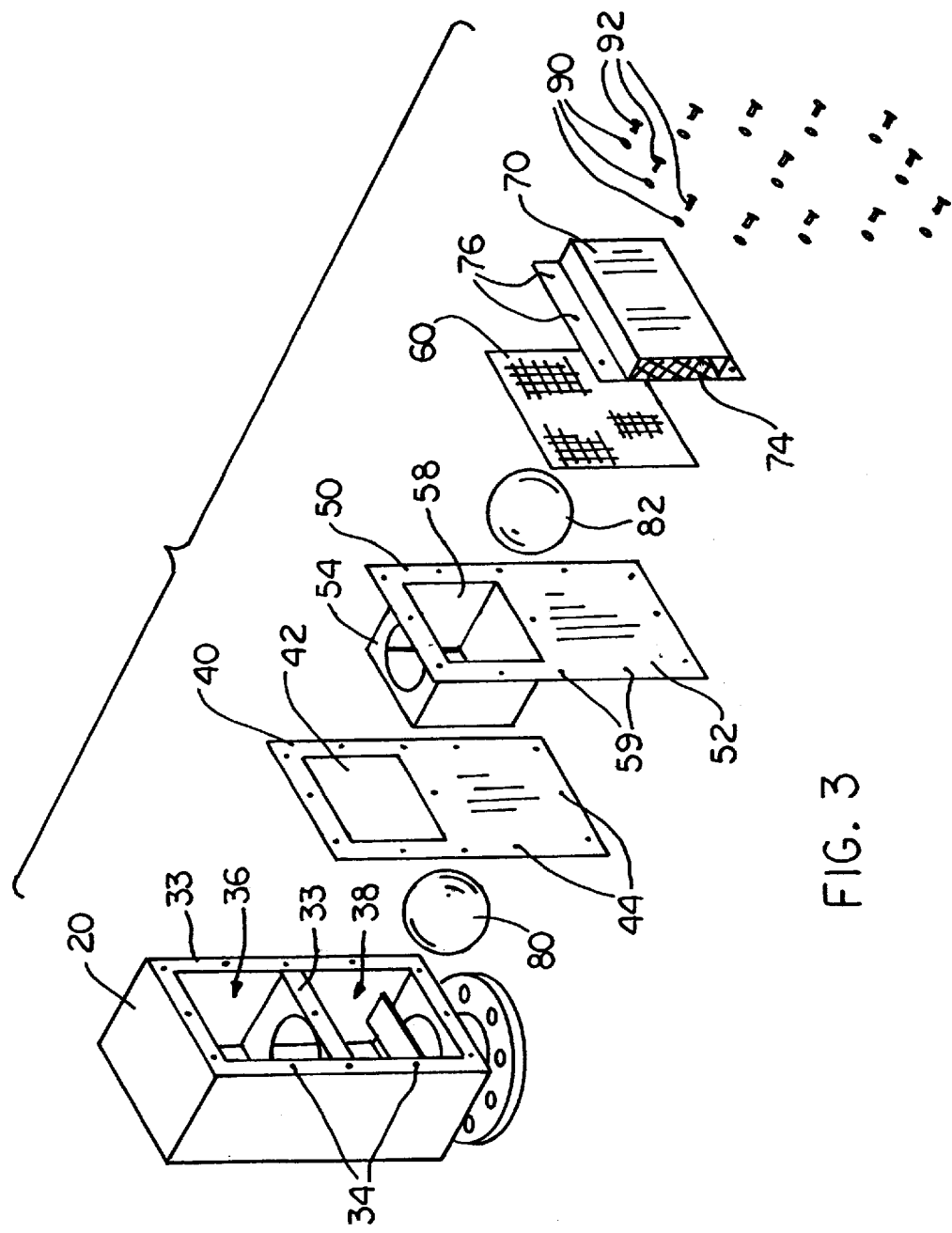
FIG. 3 is an exploded perspective view of the vent check valve shown in FIG. 2.
Figure 5:
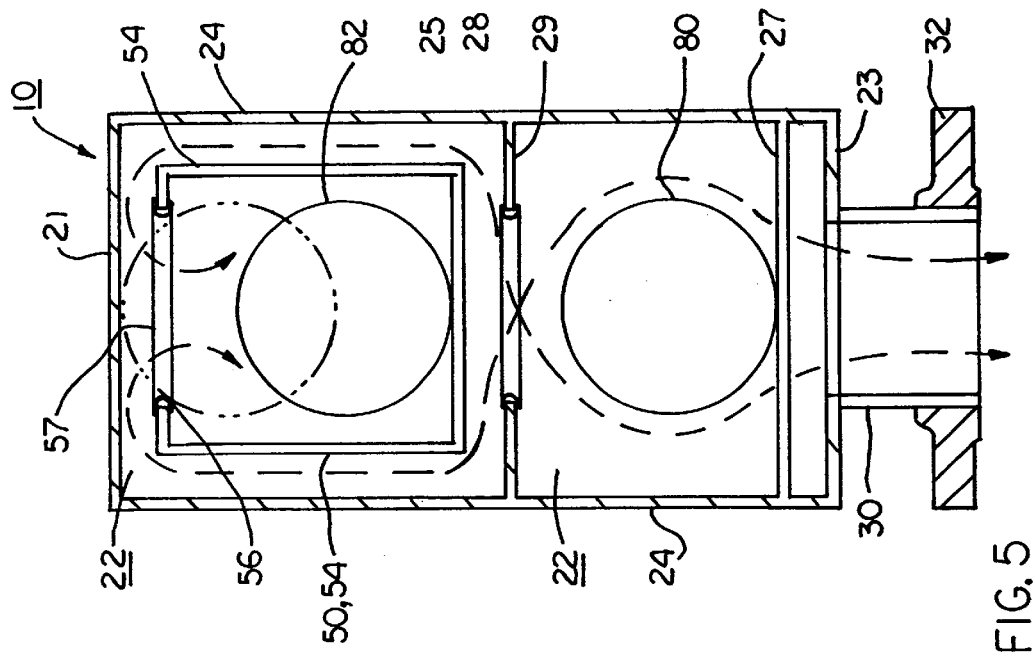
FIG. 5 is a front cross-sectional view of the vent check valve of FIG. 4.
Figure 4:
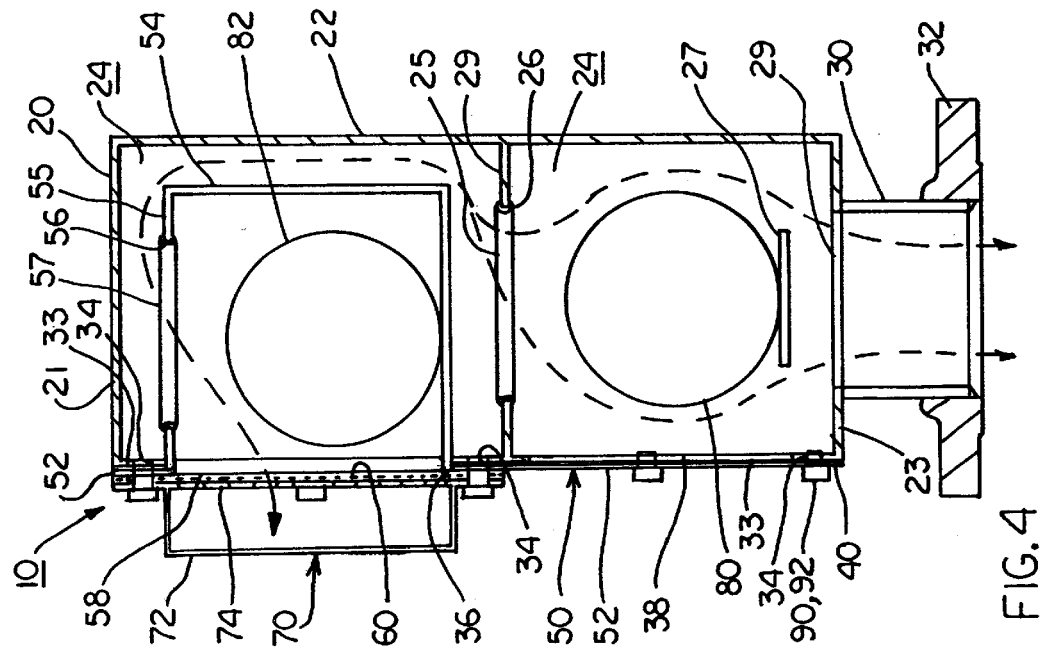
FIG. 4 is a side cross-sectional view of the vent check valve shown in FIGS. 2 and 3.

A preferred construction for valve 10 is illustrated in FIGS. 3–6. Outer housing 20 includes a top panel 21, a rear panel 22, a bottom panel 23, and side panels 24. The housing 20 also includes front face portions 33 arranged as shown. Front face portions 33 combine to form a sealing surface across the front face of outer housing 20. Bottom panel 23 includes a lower port 29. An upper end of a pipe portion 30 is connected to bottom panel 23 about lower port 29, and a flange 32 may be connected to a lower end of pipe portion 30 for connecting valve 10 to a vent pipe. A partition 29 divides the outer housing 20 into upper and lower chambers. Partition 29 includes a first circular valve opening 25, and a first valve seat 26 surrounds the first valve opening 25 as shown in FIGS. 4 and 5. A first spherical float 80 is positioned inside the lower chamber. A stop 27 is provided in the lower chamber to prevent the first float 80 from blocking the lower port 29.

As shown in FIGS. 3 and 4, the front of outer housing 20 includes an upper window 36 and a lower window 38. The upper and lower windows 36, 38 are surrounded by front faces 33. Threaded holes 34 are provided in the front faces 33 as shown. A gasket 40 extends over the front faces 33 of outer housing 20. The gasket 40 includes a gasket opening 42 which coincides with upper window 36 in the outer housing 20. Note that a lower portion of gasket 40 covers lower window 38 when the gasket overlays front faces 33 of outer housing 20. Gasket 40 includes bolt holes 44 which coincide in location with threaded holes 34 in the outer housing 20.

As shown in FIGS. 3 and 4, inner housing 50 includes a front panel portion 52 and a housing portion 54. Housing portion 54 extends through the upper window 36 of housing 20 and gasket opening 42, and extends into the upper chamber as shown. As shown in FIG. 4, housing portion 54 includes an upper panel 55 with a second circular valve opening 54. A second valve seat 56 surrounds the second valve opening 54. Preferably, the first and second valve seats 26, 56 are comprised of an elastomeric sealing material such as EPDM rubber or the like. A second spherical float 82 is positioned inside the housing portion 54 of inner housing 50 as shown.

Figure 6:
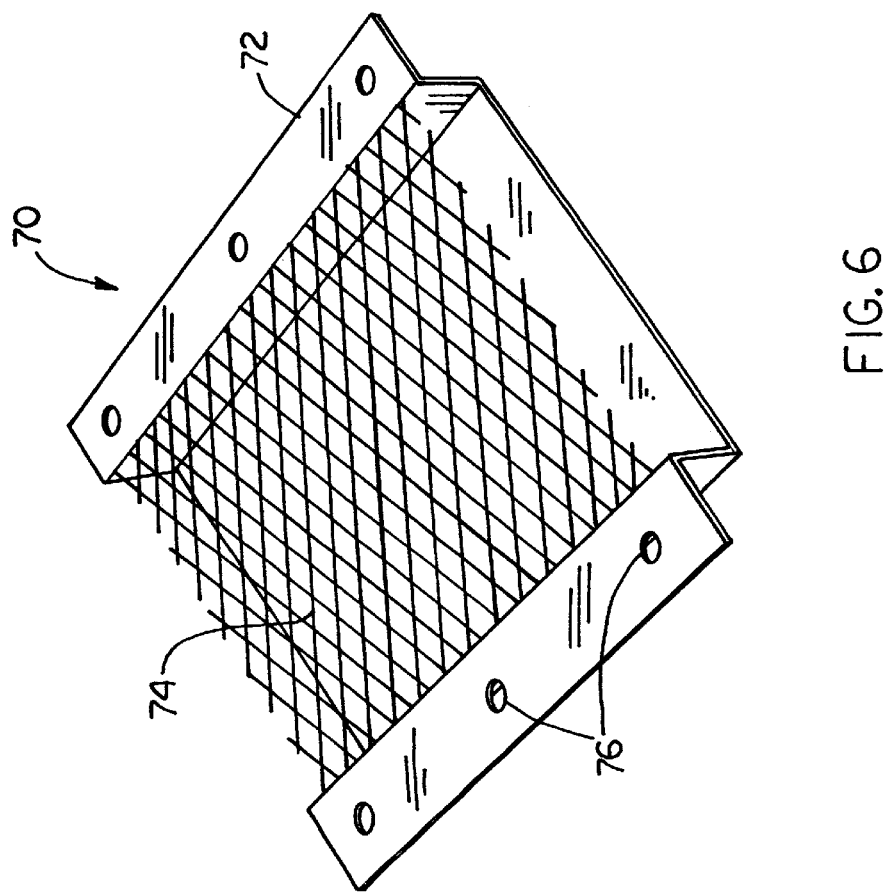
FIG. 6 is a perspective view of a baffle cover assembly for the vent check valve shown in FIGS. 2–5.

The front panel portion 52 of inner housing 50 overlays gasket 40. Front panel 52 includes bolt holes 59 which coincide in location with holes 44 in gasket 40 and threaded holes 34 in outer housing 20. Front panel 52 includes an upper port 58 which communicates with housing portion 54. An insect screen 60 may overlay upper port 58 as shown. Valve 10 further includes a baffle cover 70. As shown in FIG. 6, baffle cover 70 includes a cover portion 72 and a screen portion 74 attached to the cover portion. The baffle cover 70 is configured to cover and protect the upper port 58 while still permitting air or other gases to freely pass through port 58. Cover portion 72 includes bolt holes 76 which coincide in position to matching holes 59 in front panel 52, matching bolt holes 44 in gasket 40, and matching threaded holes 34 in outer housing 20. As shown in FIGS. 3 and 4, bolts 92 and washers 90 are used to fix the cover baffle 70, insect screen 60, front panel 52, and gasket 40 to outer housing 20. Once these components are assembled together, gasket 40 provides a seal around the perimeters of upper window 36 and lower window 38, such that lower port 29 and upper port 58 are the only points where gases or fluids may enter or exit the valve 10.

As indicated by the dashed lines in FIGS. 4 and 5, the lower port 29, the first valve opening 25, the second valve opening 57, and the upper port 58 define a gas flow path. Under dry conditions, air and gases are free to pass in either direction through the ports 29, 58 and valve 10. "Dry conditions" as used herein is defined as those conditions where fluid levels are insufficient to sufficiently elevate either float 80 or float 82 to engage their respective valve seats 26, 56.

In a preferred construction, the outer body 20, the inner body 50, the baffle cover 70, pipe portion 30, and flange 32 are constructed of carbon steel. The surfaces of these steel components preferably are coated with a powder coat epoxy to resist corrosion. Insect screen 60, bolts 90, and washers 90 preferably are constructed of stainless steel. Floats 80 and 82 are preferably constructed of high density polyethylene or the like, and are preferably hollow.

Operation of valve 10 is illustrated in FIGS. 11A–11D. FIG. 11A shows the valve in an open position under dry conditions. In this open position, neither first float 80 nor second float 82 is pushed upward by elevated fluids, and the respective valve seats are therefore open to permit gas or air to pass through the valve in either direction as indicated by the dashed lines. FIG. 11B shows the valve in a closed position during flood conditions. As rising flood water enters the valve housing through the upper port, the buoyancy of second float 82 causes the float to engage its valve seat. As the float 82 is forced against its seat, the flood water is prevented from passing into and through the valve as shown. Therefore, float 82 is triggered by elevated liquids exterior to the valve, and prevents such liquids from passing into the vent pipe on which valve 10 is mounted. The valve 10 is therefore effective to substantially prevent exterior liquids which have risen above a certain external trigger level from entering the sewer through the vent.

FIG. 11C shows valve 10 in a closed position during a sewer overflow condition. Here, once the associated sewer line has reached its capacity, liquids in the sewer will attempt to pass out of the sewer through the vent pipe. As the liquid rises inside the valve 10, the buoyancy of float 80 causes the float to engage its valve seat, thereby preventing the liquid from passing through the valve 10. Therefore, the valve is effective to substantially prevent liquids which have risen to a certain internal trigger level inside the valve from passing out of the sewer through the vent. Finally, FIG. 11D shows the valve in a closed position during a combination of sewer overflow conditions and flood conditions. Here, both floats 80, 82 are engaged in their respective valve seats, thereby preventing either floodwater or sewer overflow from passing through the valve.

Valve 10 can be quickly and easily disassembled for inspection or cleaning. The upright construction makes the valve readily accessible. Also, because the valve permits the vent pipe to be short, the valve can be positioned at an elevation which can be reached from ground level. Baffle cover 70 can be removed for access to the upper valve chamber by removing the associated screws 92. When all screws 92 are removed, the inner housing 50 and gasket 40 can be removed for access to both the upper and lower valve chambers.

Figure 7:
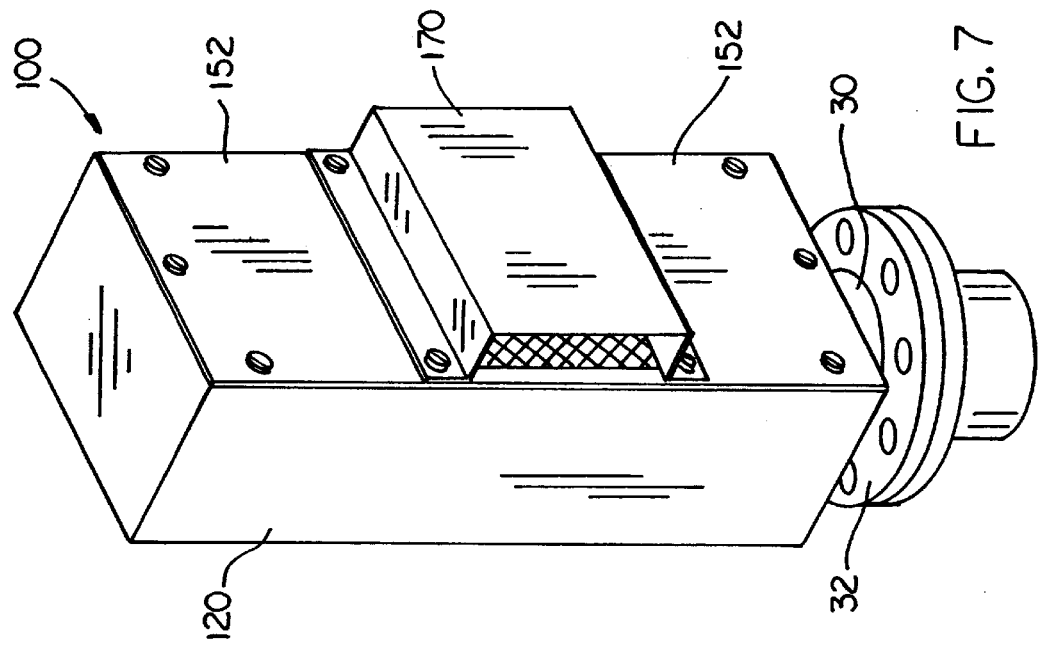
FIG. 7 is a perspective view of a second embodiment of a vent check valve according to the present invention.

FIGS. 7–10 illustrate a second valve embodiment 100 which includes a basket enclosure portion for containing an odor adsorbent material for eliminating objectionable odors from sewer gases or the like exiting through the valve. As can be seen in FIG. 7, valve 100 is very similar in construction to valve 10 which was described in detail above. The following description is therefore primarily limited to any differences from valve 10 as described above. Valve 100 includes an elongated outer housing 120, a removable front panel 152, and a baffle cover 170. Pipe portion 30 extends from the base of the valve and includes a flange 32 for connection to a vent pipe. Outer housing 120 is taller than the outer housing 20 described above to provide space in the upper chamber for containing an odor adsorbing material such as activated carbon.

Figure 10:
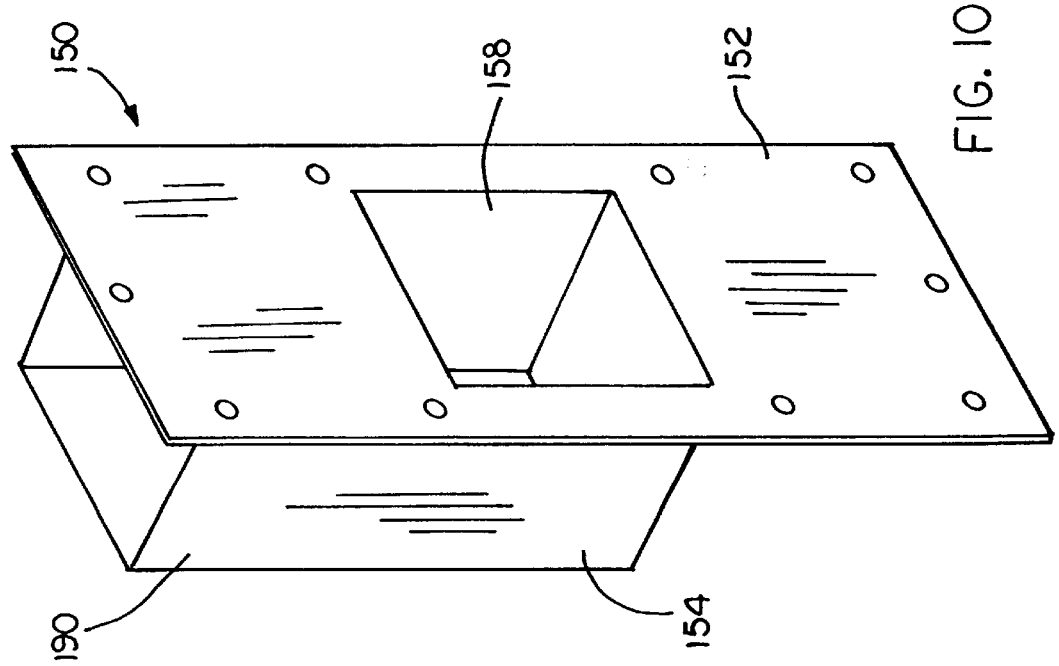
FIG. 10 is a perspective view of an inner housing for use in the valve shown in FIGS. 7–9.
Figure 16:
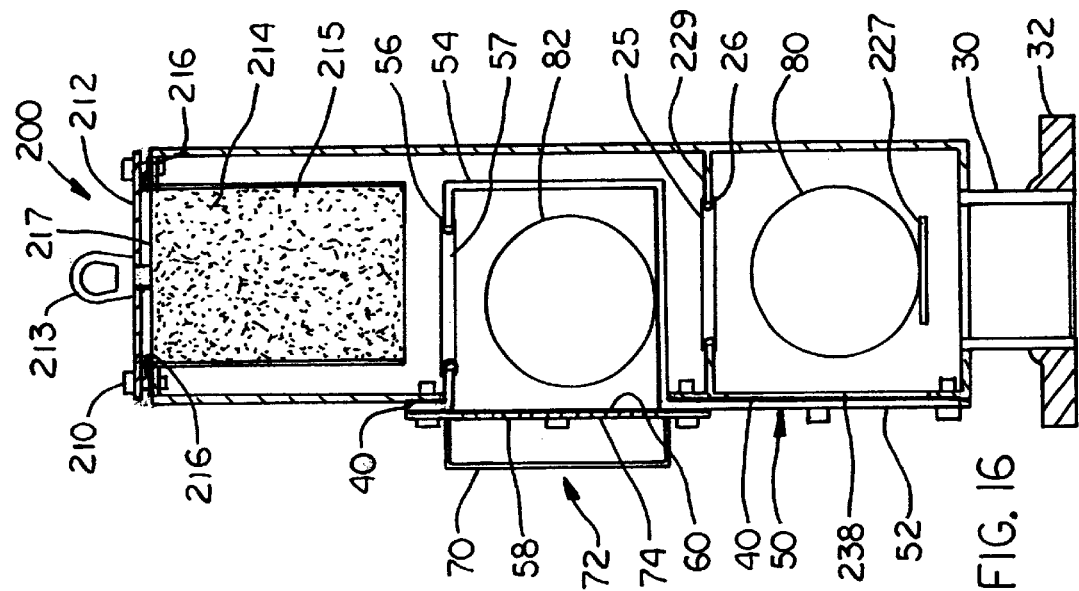
FIG. 16 is a side cross-sectional view of the valve shown in FIGS. 13–15 taken along line 16—16 in FIG. 15.
Figure 15:
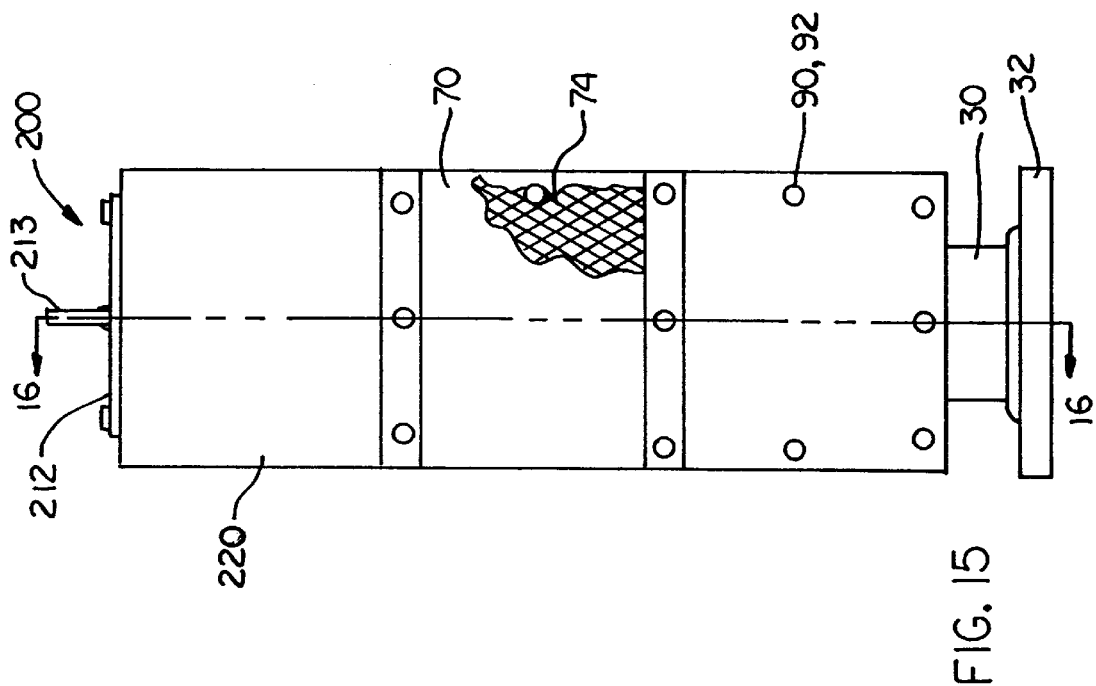
FIG. 15 is a front elevation view of the valve shown in FIGS. 13 and 14.

As shown in FIGS. 8–10, inner housing 150 includes an elongated front panel portion 152 and an elongated inner housing portion 154. A basket portion 190 is provided on the inner housing 150 above an upper valve opening 157 and upper valve seat 156. Basket portion 190 is open at the top as shown. An odor adsorbing material such as activated carbon (not shown) may be suspended in the basket portion 12 for adsorbing odors from sewer gases passing through the valve 100 in a path as indicated by the dashed lines in FIGS. 8 and 9. Valve 100 operates to prevent the passage of elevated liquids in the same way as described above for the first embodiment 10.

Figure 12:
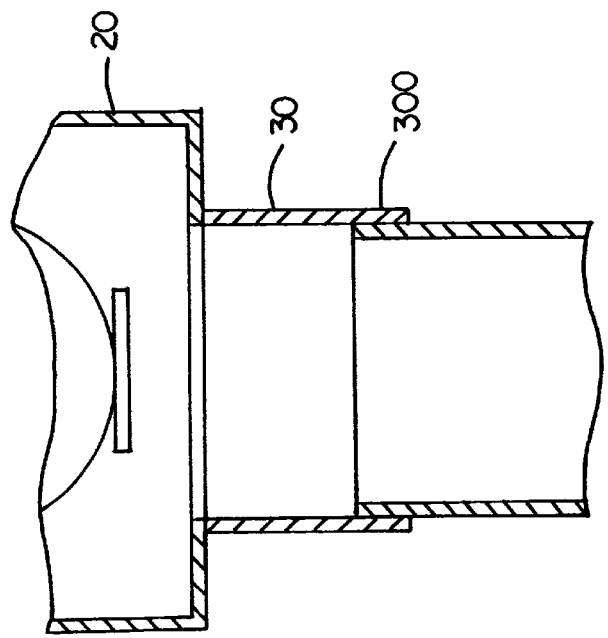
FIG. 12 is a cross sectional view of an alternative connection between the valve and a vent pipe.

FIG. 12 shows an alternative arrangement for connecting either valve 10 or valve 100 to a vent pipe. Rather than including a flange on the lower end of the valve, a socket portion 300 may be provided on the pipe portion 30. Socket portion 300 can be sized to provide a close slip-fit over the end of a vent pipe as shown. The socket portion 300 can be welded to the vent pipe to secure the valve and seal the connection.

FIGS. 13–16 illustrate a third embodiment 200 of a dual-action vent check valve according to the present invention. Like the embodiment illustrated in FIGS. 7–10 and described above, the third embodiment also includes a deodorizer basket in an upper portion of the valve. As shown in FIGS. 13–16, the valve 200 includes an outer housing 220. The outer housing includes an opening 217 in a top surface of the housing 220. The opening 217 is designed to receive a deodorizer basket 215 for holding an odor adsorbent material 215. The basket 214 is constructed of a porous material such as wire mesh or the like to permit gases to pass through the basket 214 and the odor adsorbing material 215 therein. A gasket 216 is provided to cooperate with a removable cap 212 to cover and seal the opening 217. A plurality of bolts 210 secure the cap 212 to the top of the housing 220. An eyelet 213 is provided on the cover 212 for grasping and lifting the cover 212 during removal and installation.

This embodiment 200 provides several advantages over the valve illustrated in FIGS. 7–10 and described above. First, the valve 200 shares many components in common with the first embodiment 10 illustrated in FIGS. 1–6. A comparison of FIG. 14 with FIG. 3 shows that the two valves 10 and 200 share the following identical components: baffle cover 70, insect screen 60, upper float 82, inner housing 50, gasket 40, and lower float 80. These common components help to reduce production costs when the two embodiments are produced simultaneously. Second, valve 200 provides easy and direct access to the deodorizer basket 214 and the deodorizing material 215 contained therein without the need to remove the front panel 52 and inner housing 54 from the valve 200. By removing the bolts 210, the cap 212 and basket 214 can be easily removed from the top of the valve 200 for inspection, cleaning, or replacement of the odor adsorbent material 215. The basket 214 and cap 212 can then be easily reinstalled onto the valve 200. Otherwise, the valve 200 is very similar in construction and operation to the other embodiments 10 and 100 as described above.

While this invention has been illustrated and described in accordance with preferred embodiments, it is recognized that variations and changes may be made therein without departing from the invention as set forth in the claims. Certain modifications and improvements will occur to those skilled in the art upon a reading of the forgoing description. It should be understood that all such modifications are not contained herein for the sake of conciseness and readability, but are properly within the scope of the following claims.

What is claimed is:

1. A vent check valve comprising:
   (a) an outer housing including a first port and a second port, the first and second ports being arranged to permit gases to pass through and between the first and second ports in two opposed directions during dry conditions;
   (b) a first check valve in the housing, the first check valve being designed to substantially prevent a first elevated liquid inside the valve that has risen to or above a first trigger level from passing through the valve;
   (c) a second check valve in the housing, the second check valve being designed to substantially prevent a second elevated liquid external to the valve that has risen to or above a second trigger level from passing through the valve;
   (d) wherein the first and second check valves are substantially vertically aligned one above the other; and
   (e) wherein the outer housing includes at least one removable panel, the at least one panel being configured to permit access to at least one of the check valves in the valve housing when the panel is removed from the valve.

2. A vent check valve comprising:
   (a) an outer housing including a first port and a second port, the first and second ports being arranged to permit gases to pass through and between the first and second ports in two opposed directions during dry conditions;
   (b) a first check valve in the housing, the first check valve being designed to substantially prevent a first elevated liquid inside the valve that has risen to or above a first trigger level from passing through the valve;
   (c) a second check valve in the housing, the second check valve being designed to substantially prevent a second elevated liquid external to the valve that has risen to or above a second trigger level from passing through the valve;
   (d) wherein the first and second check valves are substantially vertically aligned one above the other; and
   (e) wherein the valve further includes a deodorizer basket for holding an odor adsorbing material, wherein the basket is positioned in the valve such that gas or vapor passing through the valve passes through the odor adsorbing material in the basket before exiting the valve.

3. A vent check valve comprising:
   (a) an outer housing including a first port and a second port, the first and second ports being arranged to permit gases to pass through and between the first and second ports in two opposed directions during dry conditions;
   (b) a first check valve in the housing, the first check valve being designed to substantially prevent a first elevated liquid inside the valve that has risen to or above a first trigger level from passing through the valve;
   (c) a second check valve in the housing, the second check valve being designed to substantially prevent a second elevated liquid external to the valve that has risen to or above a second trigger level from passing through the valve;
   (d) wherein the first and second check valves are substantially vertically aligned one above the other;
   (e) wherein the second port includes a screen designed to substantially prevent solids from entering the valve through the second port; and
   (f) wherein the screen is affixed to a baffle cover, the baffle cover being removably affixed to an outer surface of the outer housing proximate the second port, and the baffle cover is configured to permit gases to pass through the screen and second port while at least partially covering the second port.

4. A vent check valve comprising:
   (a) an outer housing including a bottom and a front, the bottom including a lower port and the front including an upper port;
   (b) a partition dividing the outer housing into an upper chamber and a lower chamber, the partition including a first valve opening having a first valve seat;
   (c) an inner housing disposed in the upper chamber, the inner housing including a top having a second valve opening and a second valve seat, and a window in communication with the upper port; wherein the lower port, the first valve opening, the second valve opening, the window, and the upper port together define a gas flow path through the valve;
   (d) a lower float disposed in the lower chamber, the lower float being designed to cooperate with the first valve seat to substantially prevent rising liquid in the lower chamber which has entered the valve through the lower port from passing from the lower chamber into the upper chamber; and
   (e) an upper float disposed in the inner housing in the upper chamber, the upper float being designed to cooperate with the second valve seat to substantially prevent rising liquid exterior to the outer housing which has entered the valve through the upper port from passing from the upper chamber into the lower chamber;
   (f) wherein the second valve opening is substantially vertically above the first valve opening and is substantially vertically aligned therewith.

5. A vent check valve according to claim 4 wherein outer surfaces of the outer housing substantially form a parallelepiped.

6. A vent check valve according to claim 4 further including a pipe portion having a top end connected to the lower port of the outer housing, and a bottom end configured for connection to a substantially vertical vent pipe.

7. A vent check valve according to claim 6 wherein the bottom end of the pipe portion includes a flange suited for connection to a mating flange on the vent pipe.

8. A vent check valve according to claim 6 wherein the bottom end of the pipe portion includes a socket portion designed for engagement with the vent pipe.

9. A vent check valve according to claim 4 wherein the front of the outer housing includes a removable panel, the removable panel being designed to permit access to the lower chamber when the cover is removed from the housing.

10. A vent check valve according to claim 9, wherein the removable panel includes the upper port.

11. A vent check valve according to claim 9 wherein the housing includes a panel sealing surface, and further comprising a cover gasket, the gasket being suited for assembly between the panel and the sealing surface of the housing to substantially seal against the passage of fluids between the panel and housing sealing surface when the panel is mounted to the housing.

12. A vent check valve according to claim 4, further comprising an outer screen, wherein the outer screen is affixed to the housing and substantially overlays the upper port, and wherein the outer screen is configured to substantially prevent solids from entering the valve through the upper port while permitting gases and fluids to pass through the upper port.

13. A vent check valve according to claim 12 wherein the outer screen is removably affixed to the housing.

14. A vent check valve according to claim 12, wherein the outer screen is affixed to a baffle cover and the baffle cover is affixed to an outer surface of the outer housing proximate the upper port, the baffle cover being configured to permit gas to pass through the upper port and screen while at least partially covering the upper port and screen.

15. A vent check valve according to claim 14 wherein the baffle cover is removably affixed to the outer housing.

16. A vent check valve according to claim 15, the valve further including a secondary screen, the secondary screen having a finer mesh than a coarser mesh of the outer screen, wherein the secondary screen is entrapped between the outer housing and the baffle cover.

17. A vent check valve according to claim 4 wherein the upper and lower floats are substantially spherical and the first and second valve openings have substantially circular shapes.

18. A vent check valve according to claim 4 wherein the first and second valve seats include elastomeric seals for cooperation with the upper and lower floats, the elastomeric seals being designed to substantially seal the first and second valve openings when the floats are cooperatively engaged with the seals.

19. A vent check valve according to claim 4 and further including a deodorizer basket in the upper chamber proximate the second valve opening, wherein the deodorizer basket is designed for containing a quantity of odor adsorbing material such that gas passing from the lower port to the upper port substantially passes through the basket and the odor adsorbing material contained therein.

20. A vent check valve according to claim 19 wherein the deodorizing basket includes activated carbon as the odor adsorbing material.

21. A vent check valve according to claim 19 wherein the outer housing includes a top having a basket receiving opening, wherein the basket can be inserted into and removed from the outer housing through the basket receiving opening, and further including a removable cap configured to cover and seal the basket receiving opening when the cap is affixed to the outer housing.

22. A vent check valve according to claim 4 wherein the inner housing is removably affixed to the outer housing.

23. A vent check valve according to claim 4, wherein the front of the outer housing includes a removable cover, the removable cover being designed to permit access to the lower chamber when the cover is removed from the housing, wherein the removable cover includes the upper port, and wherein the inner housing is affixed to the removable cover such that the window of the inner housing is coextensive with the upper port.

* * * * *